H. B. VOGEL.
PULLEY AND LIKE WHEEL.
APPLICATION FILED AUG. 8, 1917.
1,263,631. Patented Apr. 23, 1918.
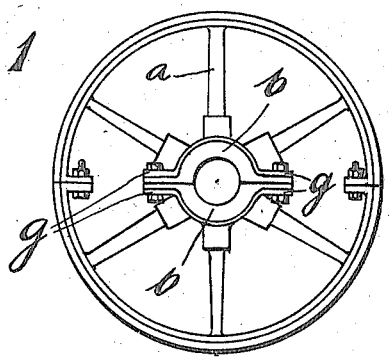
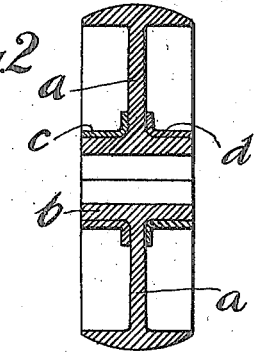
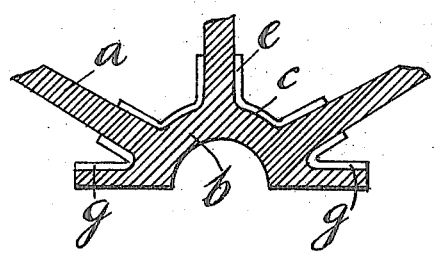
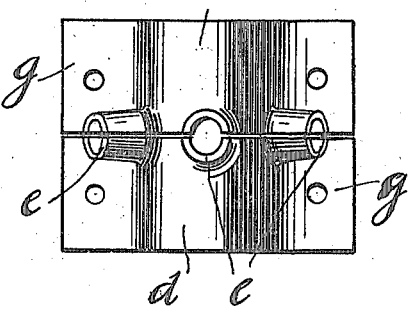
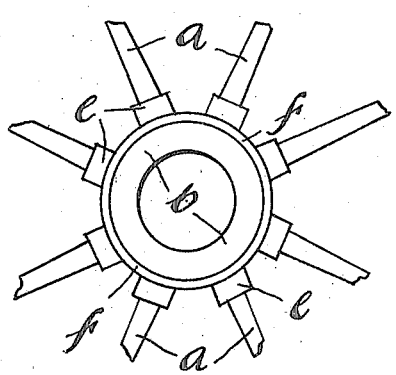
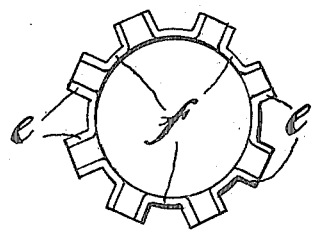
Inventor:-
Harry Benjamin Vogel,
By: B. Singer, Atty.

UNITED STATES PATENT OFFICE.

HARRY BENJAMIN VOGEL, OF EAST MOLESEY, ENGLAND.

PULLEY AND LIKE WHEEL.

1,263,631.

Specification of Letters Patent.

Patented Apr. 23, 1918.

Application filed August 8, 1917. Serial No. 185,138.

*To all whom it may concern:*

Be it known that I, HARRY BENJAMIN VOGEL, of Angle House, East Molesey, Surrey, England, manufacturer, subject of the King of Great Britain, have hereby invented certain new and useful Improvements in and Relating to Pulleys and like Wheels, of which the following is a specification.

This invention comprises improvements in and relating to pulleys and like wheels, and has for its object to provide an improved combined cast iron and wrought iron solid or split pulley, in which while the pulley is of cast iron this is reinforced around the boss and may be some distance around the spokes also with a wrought iron band or sleeve.

Pulleys are known in which the cast iron boss is reinforced by a plain wrought iron ring or band secured on the boss at each side of the spokes forming two separated bands or rings.

In my invention I form a band or sleeve for the full width of the boss with apertures to clear the spokes and this is placed in the mold in which the cast wheel is cast, and as the metal is run in the wrought iron band or sleeve it is permanently secured in place surrounding the cast boss, and although the cast iron does not actually weld to wrought iron a very intimate and secure fit is obtained and a great addition to the strength of the pulley results.

If desired in punching the spoke holes in the wrought iron sleeve I may press or draw the wrought iron out to form radial sockets to surround the spokes for a short distance, and thus reinforce them at the point where they join the hub or boss.

On the drawings:—

Figure 1 is an elevation of a split cast pulley reinforced in accordance with my invention.

Fig. 2 is a central transverse vertical section thereof.

Fig. 3 is a central longitudinal section of the boss portion of one half drawn to a larger scale.

Fig. 4 is a plan of the reinforcing sleeve of one half of the pulley showing one method of manufacture.

Fig. 5 shows a solid cast pulley boss with my invention applied.

Fig. 6 is an inner face view of one half of the strengthening sleeve, shown in Fig. 5.

In constructing the reinforcing sleeve with socket parts embracing the spokes *a* at their junction with the boss *b* of the pulley, I may proceed by pressing from sheet metal two half rings *c*, *d*, with hollow trough sockets *e* in each, for each half of a split pulley as at Fig. 4, or by pressing two complete rings *f* with hollow trough sockets *e* as at Fig. 6 for a solid cast pulley. In the former case two half rings are brought edge to edge with the hollow parts of the socket *e* facing inward as at Fig. 4 and are welded or secured such as by oxy-acetylene or electric welding, along their meeting edges to form one complete half sleeve ready for one half of a split pulley. In the second case I proceed exactly as before except that two complete rings *f* are brought together and welded to form one complete reinforcing ring or sleeve.

The half sleeve or complete sleeve thus formed is placed in the mold in which the half of a split pulley or a complete wheel in the case of the solid pulley, is to be cast and the metal is run into the mold and through the wrought sleeve which remains upon the finished cast boss in the manner shown at Figs. 1, 2, 3, and 5.

In the case of a split pulley the two half sleeves have extensions *g* to take over the bolting lugs of the halves of the pulley which greatly strengthens these lugs.

With the above improvement in use the combined cast and wrought pulleys possess advantages over cast pulleys with wrought rings secured thereon after casting. The cast iron and wrought iron are fitted more snugly together, this is especially so at the lugs of a split pulley, and instead of two separated rings on the boss one continuous sleeve extends over the hub on both sides of the spokes and around the spokes, and if desired with integral extensions up the spokes for a short distance.

I claim:—

1. Pulleys and like wheels of cast iron having a boss and spokes between said boss and the rim, said boss having a reinforcing sleeve secured around it in the casting operation.

2. Pulleys and like wheels of cast iron having a boss and spokes between said boss and the rim, said boss having a reinforcing sleeve around it and said sleeve having socket portions for embracing parts of said spokes said sleeve being secured around said boss in the casting operation.

3. Pulleys and like wheels of cast iron having a boss and spokes between said boss and the rim, said boss having a reinforcing sleeve cast around it, said sleeve having socket parts for embracing parts of said spokes, said sleeve being formed in parts meeting edge to edge at the central plane of the spokes.

4. Pulleys and like wheels of cast iron having a boss and spokes between the boss and a rim, said boss having a reinforcing sleeve cast around it; said sleeve having socket parts for embracing parts of said spokes, said sleeves being formed in separate parts each part having trough extensions to form the portions for embracing the spokes, and said parts meet edge to edge at the central plane of the spoke.

In testimony whereof I affix my signature.

HARRY BENJAMIN VOGEL.